United States Patent [19]

Chikaraishi et al.

[11] Patent Number: 4,492,405
[45] Date of Patent: Jan. 8, 1985

[54] SEALING STRUCTURE FOR AUTOMOTIVE VEHICLE SIDE DOORS

[75] Inventors: Takayo Chikaraishi, Kawasaki; Yosimasa Tuchiya, Ebina; Kazunori Kawamo, Atsugi, all of Japan

[73] Assignees: Nissan Motor Company, Limited, Yokohama; Nissan Shatai Company, Limited, Hiratsuka, both of Japan

[21] Appl. No.: 513,401

[22] Filed: Jul. 14, 1983

[30] Foreign Application Priority Data

Jul. 16, 1982 [JP] Japan ................................ 57-124192

[51] Int. Cl.³ .............................................. B60J 5/04
[52] U.S. Cl. .................................... 296/146; 296/154; 296/213; 49/483
[58] Field of Search ............... 296/146, 154, 155, 213; 49/483, 476

[56] References Cited

U.S. PATENT DOCUMENTS

| 3,432,966 | 3/1969 | Bordner | 49/483 |
| 3,728,819 | 4/1973 | Goldbach et al. | 49/216 |
| 4,378,130 | 3/1983 | Shimizu | 296/146 |

FOREIGN PATENT DOCUMENTS

| 57-45420 | 3/1982 | Japan . |
| 57-45419 | 3/1982 | Japan . |
| 57-41209 | 3/1982 | Japan . |
| 1091332 | 11/1967 | United Kingdom . |

Primary Examiner—Robert R. Song
Attorney, Agent, or Firm—Schwartz, Jeffery, Schwaab, Mack, Blumenthal & Koch

[57] ABSTRACT

A sealing structure for an automotive vehicle is adapted to establish a water-proof seal for a type of vehicle which has no pillar between adjacent front and rear doors. The seal between the adjacent doors serves as a downspout for a vehicle roof gutter for draining any water which might leak from the gutter.

14 Claims, 12 Drawing Figures

SEALING STRUCTURE FOR AUTOMOTIVE VEHICLE SIDE DOORS

BACKGROUND OF THE INVENTION

The present invention relates generally to a sealing structure for automotive vehicle doors and more specifically to a door sealing structure for a vehicle having no pillar between adjacent forward and rear doors. More particularly, the invention relates to a drain structure in the door seal.

British Pat. No. 370,837 discloses an Improvement in Motor or Other Vehicle Bodywork concerning a vehicle body construction with no pillar between adjacent front and rear doors. In such a center-pillarless vehicle body structure it is difficult to establish a water-proof seal between the front and rear door edges. To establish a water-proof seal between the front and rear doors, the Published Japanese Utility Model Application No. 57-45420 discloses a sealing structure provided for the front and rear doors of this type. Specifically, according to the Japanese Utility Model Publication, a sealing structure between a front swinging door and a rear sliding door is provided.

The invention is to improve the sealing structure of vehicles of this type in order to provide completely water-proof bodywork for the automotive vehicle.

SUMMARY OF THE INVENTION

Therefore, it is an object of the present invention is to provide a sealing structure for a vehicle of the center-pillarless type, which sealing structure includes means for draining leakage water between sealing surfaces in order to prevent the water from entering into the vehicle compartment.

Another object of the present invention to provide a sealing structure for an automotive vehicle having no pillar between front and rear doors, which sealing structure provides at least two surfaces of water-proof sealing contact between the opposing edge of the front and rear doors.

To accomplish the foregoing and other objects, there is provided a sealing structure for sealing directly opposing edges of the front and rear doors of the vehicle. The sealing structure comprises a first seal along a longitudinal edge of the roof, which first seal includes first and second sealing members extending along the edge of the roof and adapted to sealingly contact upper edges of the front and rear doors, and a second seal between the rear edge of the front door and the opposing front edge of the rear door, which second seal includes first and second sealing members adapted to establish water-proof contact and to serve as a downspout for a vehicle roof gutter.

According to one embodiment, a sealing structure for an automotive vehicle having no pillar between adjacent front and rear doors, comprising a front door, a rear door, the front vertical edge of which opposes the rear vertical edge of the front door, upper and lower vehicle body side members extending along the upper and lower edges of a door opening to be covered by the front and rear doors, first and second seals equipped on the upper vehicle body side member and respectively adapted to water-sealingly contact the upper edges of the front and rear doors when they are in their closed positions, a third seal mounted on the rear vertical edge of the front door and adapted to contact the rear vertical edge of the front door in water-proofing fashion, and fourth seal on the front vertical edge of the rear door and adapted to contact the third seal in water-proofing fashion, at a point on the third seal different from that at which the front vertical edge of said rear door contacts same. The third and fourth seals are adapted to serve as downspout for a vehicle roof gutter.

Preferably, the first seal constitutes the vehicle roof gutter with the upper vehicle body side member, and the third and fourth seals respectively have funnel-shaped top portions associated with the first seal for correcting any water passing through the first seal.

According to another embodiment, a sealing structure for an automotive vehicle with no pillar between opposing vertical edges of front and rear doors, comprises a front door adapted to cover approximately a front half of a door opening, a rear door adapted to cover approximately a rear half of the door opening and having a front vertical edge opposing the rear vertical edge of the front door, an upper side frame extending along a longitudinal edge of a roof and supporting an edge of a roof panel which forms part of a drip channel along the edge of the roof, a first seal cooperative with the edge of the roof panel to define the drip channel and adapted to establish water-proof contact with upper edges of said front and rear doors, a second seal mounted on the side frame for establishing water-proof contact with the upper edges of the front and rear doors, the second seal being positioned below the first seal, a third seal mounted on the rear vertical edge of the front door and adapted to establish a water-proof seal in conjunction with the front edge of the rear door, a fourth seal mounted on the front vertical edge of the rear door and adapted to establish a water-proof seal in conjunction with the third seal, and the third and fourth seals being cooperative with the first seal to drain water passing through the first seal through a drain passage defined therein.

According to another embodiment, a weatherstrip arrangement for automotive vehicle doors which oppose each other directly comprises a first member mounted on one of a pair of front and rear doors adjacent to each other and adapted to sealingly contact the other door in order to establish a water-proof seal, the first member further adapted to serve as a first downspout for a vehicle roof gutter, and a second member mounted on the other door and adapted to sealingly contact the first member in order to establish a water-proof seal, the second member being cooperative with the first member form a second downspout for the vehicle roof gutter.

BRIEF DESCRIPTION OF THE INVENTION

The present invention will be described more fully with reference to the accompanying drawings of the preferred embodiment of the invention, which, however, should not be taken as limitative to the invention but for elucidation and explanation only.

In the drawings.

DESCRIPTION OF THE PREFERRED EMBODIMENT

Figure 1:
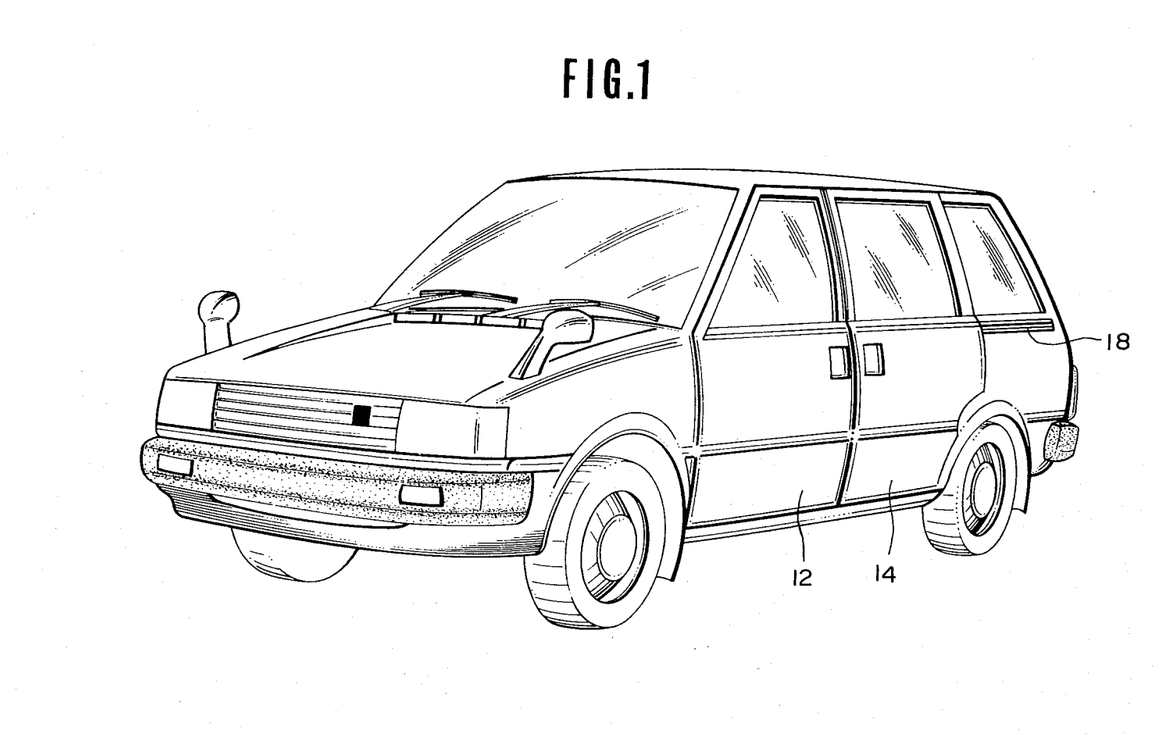
FIG. 1 is a perspective view of an automotive vehicle having no pillar between adjacent front and rear doors, to which the preferred embodiment of a sealing structure is applicable.
Figure 2:
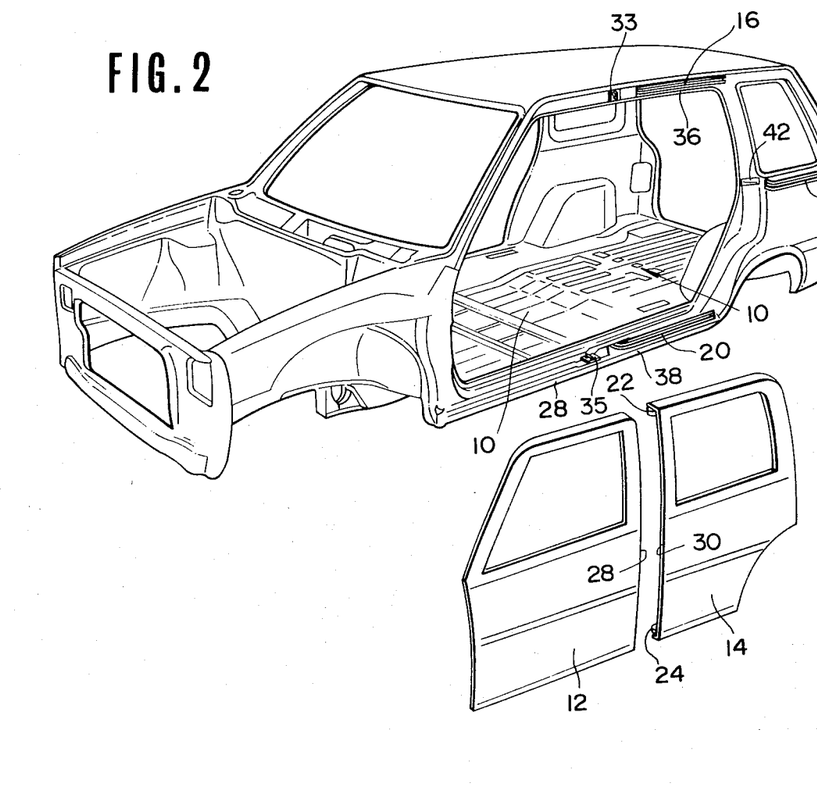
FIG. 2 is an exploded perspective view of the vehicle of FIG. 1.
Figure 4:
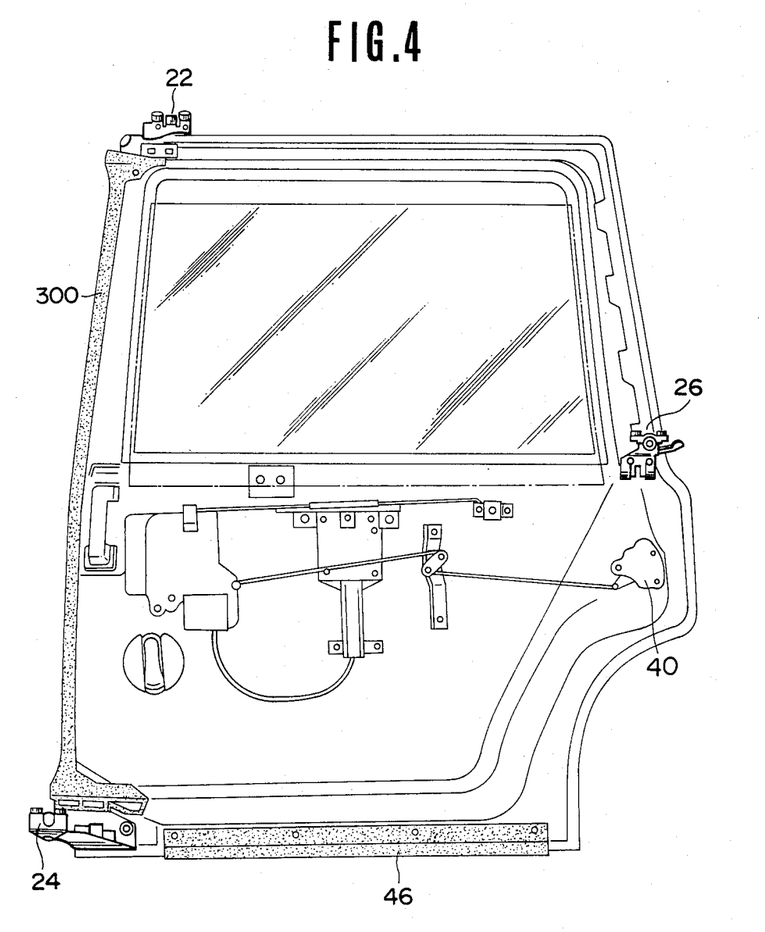
FIG. 4 is a rear elevation of a rear door in the vehicle of FIG. 1.

Referring now to the drawings, particularly to FIGS. 1 and 2, an automotive vehicle illustrated has a swinging front door 12 which is hinged at its front end to the front vertical edge of a door opening 10, and a sliding rear door 14 suspended from the vehicle body, and in particular from an upper guide rail 16, a waist guide rail 18 and a lower guide rail 20 via upper and lower slider rollers 22 and 24 and a waist slider roller 26 (shown in FIG. 4). The swinging front door 12 is adapted to cover approximately the front half of the door opening 10. On the other hand, the sliding rear door 14 is adapted to cover approximately the rear half of the door opening 10. The front and rear doors 12 and 14 have opposing rear and front vertical edges 28 and 30 respectively. As apparent from FIG. 2, the shown vehicle has no center pillar between the front and rear doors 12 and 14 so that the rear and front edges 28 and 30 of the front and rear doors 12 and 14 directly oppose one another.

Figure 3:
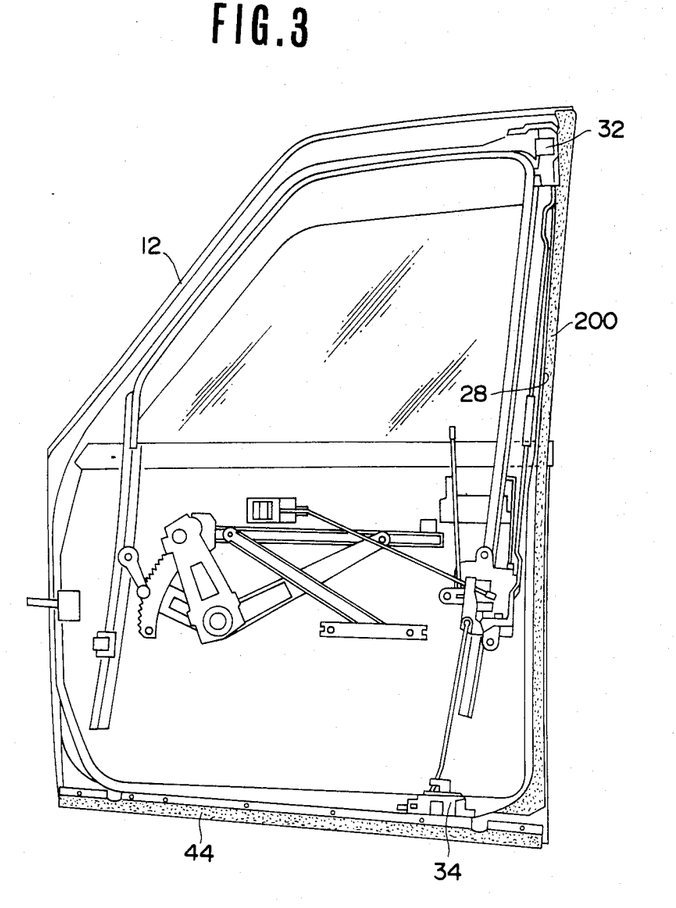
FIG. 3 is a rear elevation of a front door in the vehicle of FIG. 1.

As shown in FIGS. 2 to 4, the front door 12 has upper and lower door locks 32 and 34 near its upper and lower rear corners. The upper and lower door locks 32 and 34 are engageable with door strikes mounted on upper and lower frame members 36 and 38 of the vehicle body. A door lock 40 is provided for the rear door 14 near its rear vertical edge. The door lock 40 is engageable with a strike 42 mounted on the rear vertical edge of the door opening 10.

As shown in FIG. 3, a weatherstrip 200 is mounted along the rear vertical edge of the front door 12. A rubber sealing strip 44 is also installed along the lower horizontal edge of the front door 12. Likewise, a weatherstrip 300 is installed along the front vertical edge of the rear door 14, as shown in FIG. 4. The rear door 14 is also equipped with a rubber sealing strip 46 along its lower horizontal edge.

FIGS. 5 to 9 show more details of the preferred embodiment of the present invention. The longitudinal edge of the roof outer panel 48 along the roof side frame 36 is bent to form a drip-channel 50 in conjunction with a drip seal 52 fastened to its edge. The lateral edge of the roof outer panel 48 is supported by the roof side frame 36 to which a weatherstrip 54 is attached. The drip seal 52 has a lip 56 extending upwardly. The lip 56 is adapted to contact the upper edges 58 and 60 of the front and rear doors 12 and 14. Likewise, the weatherstrip 54 has a portion 62 protruding outwardly. The portion 62 of the weatherstrip 54 is adapted to contact a portion 64 of a door inner panel 66 of the front door 12. The portion 62 of the weatherstrip 54 is also adapted to contact the corresponding portion of the door inner panel 68 of the rear door. Therefore, a water-proof seal between the upper frame of the vehicle body and the upper edge portions 58 and 60 of the front and rear doors 12 and 14 is provided by the drip seal 52 and weatherstrip 54.

The weatherstrip 200 is mounted on the vertical surface 202 of the door inner panel 66 by means of a resin fastener 204. The weatherstrip 200 is hollow and essentially cylindrical in cross-section, so that it defines a through opening 206 which comprises an upper smaller diameter section 210 and a lower larger diameter section 208. One wall 212 of the weatherstrip 200 is in contact with a flat surface 214 where the rear end of a door outer panel 70 is bent back over the rear vertical edge of the door inner panel 66. Another wall 216 of the weatherstrip 200 opposes the front vertical edge of the rear door 14 in order to establish a water-proof seal therebetween when the doors are closed.

Figure 6:
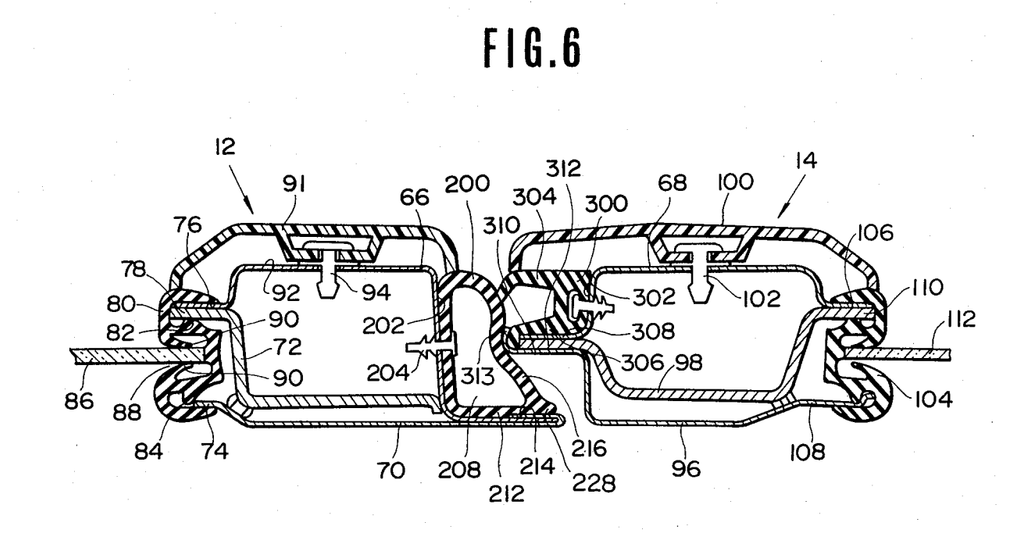
FIG. 6 is a cross-section taken along line VI—VI of FIG. 5.
Figures 7, 8:
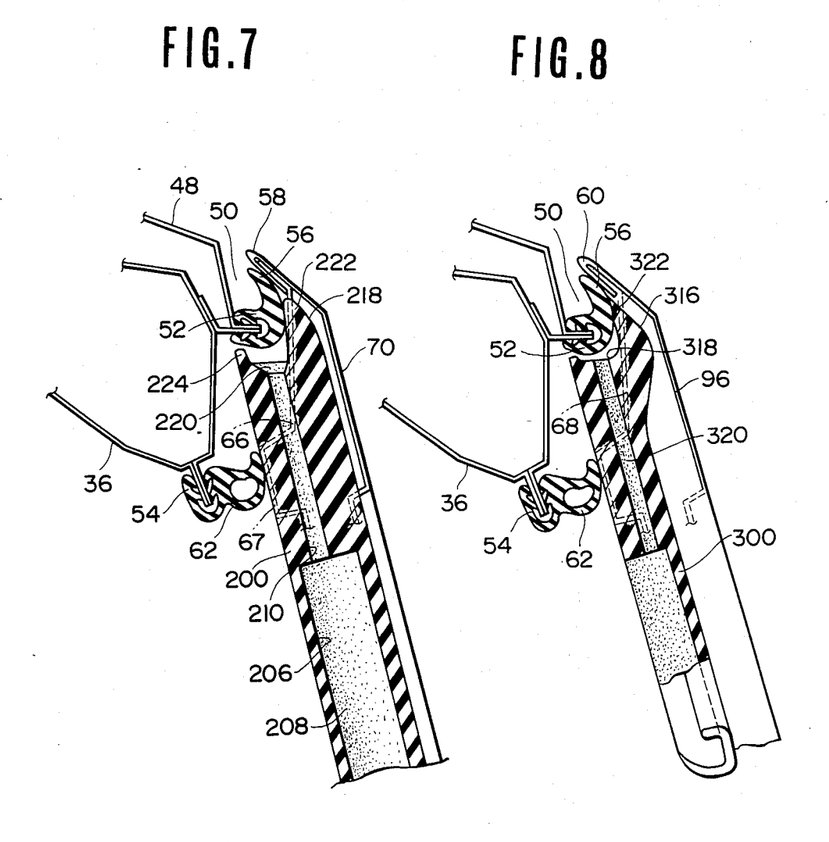
FIG. 7 is a section taken along line VII—VII of FIG. 5.
FIG. 8 is a section taken along line VIII—VIII of FIG. 5.

The front door inner panel 66 and the front door outer panel 70 define an internal space therebetween, in which a reinforcement member 72 is inserted. The outer panel 70 has a flange 74, and the inner panel has a flange 76 to which a flange 78 of the reinforcement member 72 is attached. A window weatherstrip 80 is engaged to the flanges 74, 76 and 78 along points 82 and 84. On the other hand, central sections 88 of the window weatherstrip 80 engages the edges of the window pane 86. The free ends of lips 90 extending from the central section 88 contact the window pane 86 to establish a water-proof seal. A trim strip 91 is fastened with resin fasteners 94 to a surface 92 of the inner panel 66 facing the vehicle compartment.

Similarly, the weatherstrip 300 of the rear door 14 is installed on the front vertical surface 302 of the rear door inner panel 68. The weatherstrip 300 is of essentially U-shaped configuration with lip portions 304 and 306. The lip 306 is attached to a flange 308 of the rear door inner panel 68 which is connected to a flange 310 of an outer panel 96 of the rear door. A flange 312 of a reinforcement member 98 is interposed between the flange 308 and 310 of the rear door inner and outer panels 68 and 96. A garnish 100 is attached to the surface of the rear door inner panel 68 facing the vehicle compartment with resin fasteners 102. A window weatherstrip 104 is attached on the flanges 106, 108 and 110 of the inner and outer panels 68 and 96 and the reinforcement member 98. A windowpane 112 engages the window weatherstrip 104 in water-proofing fashion.

The lip 304 is adapted to contact the wall 216 of the front door weatherstrip 200 in water-proofing fashion in order to establish first inner water-proof seal therebetween. The front end of the flange 310 of the outer panel 96 is bent to form a contact surface 313. The contact surface 313 of the rear door outer panel 96 contacts the wall 216 of the front door weatherstrip 200 to establish a second outer water-proof seal.

The weatherstrip 200 has an enlarged top section 218 longitudinally expanded and of essentially rectangular cup-shaped configuration with a water spout 220 at its floor. The top section 218 extends above the weatherstrip 54 with the water spout 220 beneath the drip seal 52. The top section 218 contacts the portion 62 of the weatherstrip 54 in water-proofing fashion. A lip 222 extends upwardly from the top of the outside vertical wall 224 of the top section 218. The lip 222 is adapted to contact the drip seal 52 in water-proofing fashion.

Figure 5:
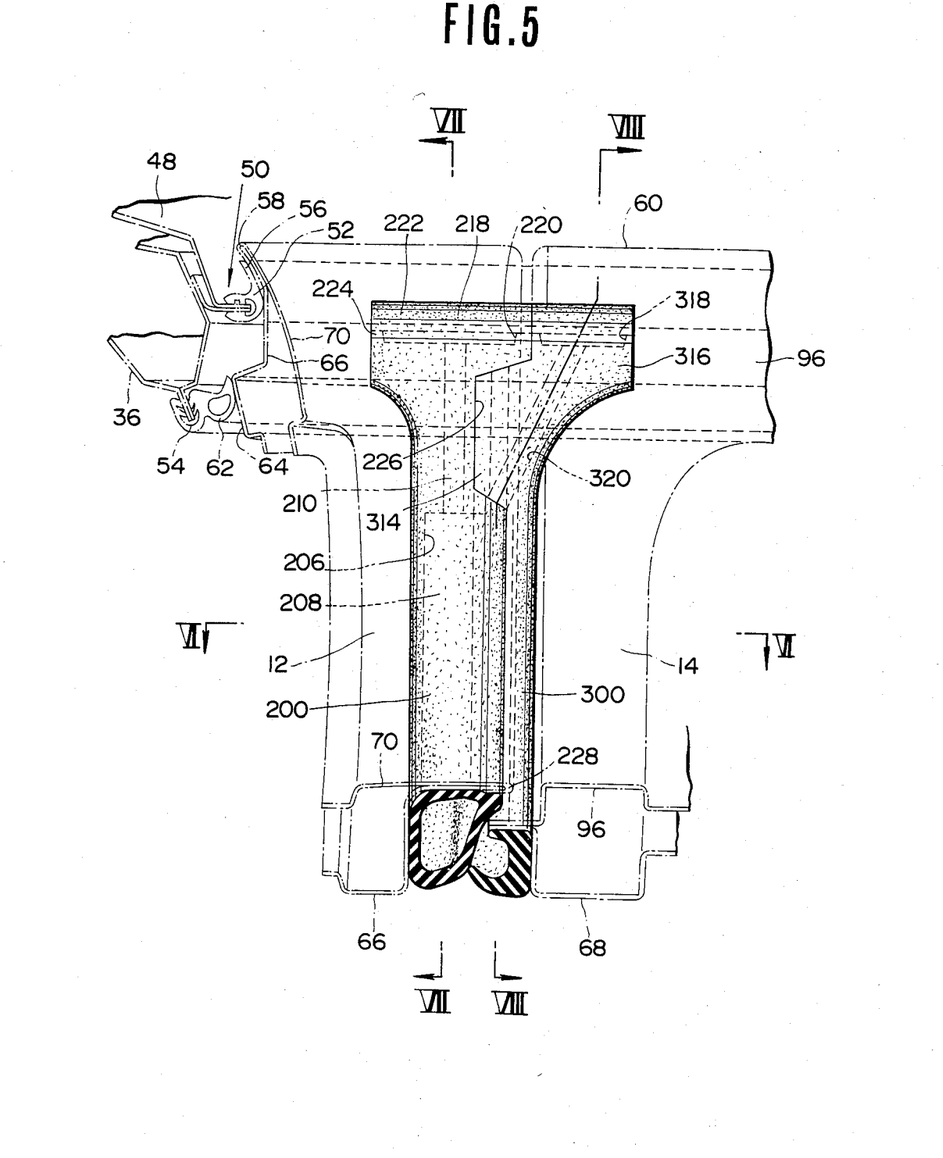
FIG. 5 is a front elevation of a major portion of the vehicle sealing structure of the preferred embodiment.
Figure 9:
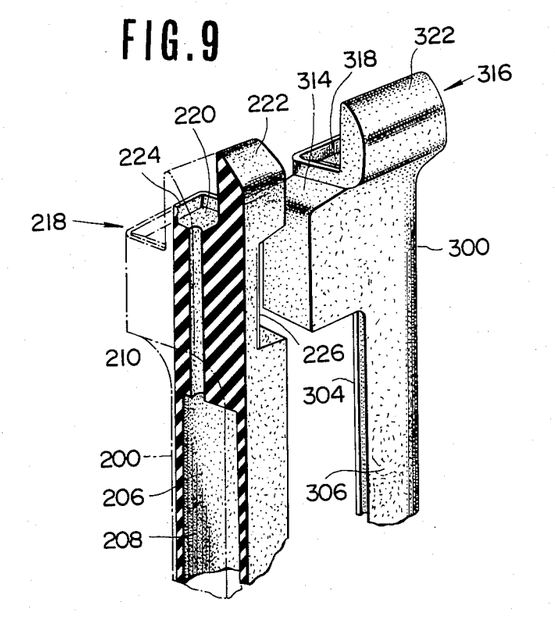
FIG. 9 is a cut-away perspective view of seals for front and rear doors.

As apparent from FIGS. 5 and 9, the weatherstrip 200 is formed with a recess 226 in the face opposing the front edge of the rear door 14. The recess 226 is adapted to engage a projection 314 protruding from an enlarged top section 316 of the weatherstrip 300 of the rear door 14.

As with the foregoing top section 218 of the weatherstrip 200 of the front door, the top section 316 of the rear door weatherstrip 300 defines a water spout 318. The water spout 318 communicates with the internal space of the substantially U-shaped major portion of the weatherstrip 300 via a passageway 320 formed through the top section. As apparent from FIG. 5, the axis of the passageway 320 for establishing communication between the water spout 318 and the top of the U-shaped section is tiled with respect to the longitudinal axis of the weatherstrip 300.

The top section 316 is positioned beneath the drip seal 52 with water-proof contact provided by a lip 322 extending from the outer wall of the top section 316. The top section 316 also establishes water-proof contact with the portion 62 of the weatherstrip 54.

The weatherstrips 200 and 300 cooperate so as to form two parallel sealing interfaces and simultaneously two parallel downspouts for possible leakage from the conventional vehicular rain gutter. The first sealing interface is the point of contact between the wall 216 of the front door weatherstrip 200 and the inboard lip 304 of the rear door weatherstrip 300. The second sealing interface is the point of contact between the wall 216 and the special contact surface 313 at the edge of the rear door outer panel 96.

According to the shown construction, the water-proofing seal along the roof side rail is established by way of water-proof contact between the drip seal and the upper edges of the front and rear door, and further between the drip seal and the top sections of the weatherstrips 200 and 300. Additional sealing along the roof side rail is established by water-proof contact between the portion 62 of the weatherstrip 54 and the inner panels of the front and rear door, and further between the portion 62 and the top sections of the weatherstrips 200 and 300. A vertical seal between the rear edge of the front door and the front edge of the rear door is established by water-proof contact between the wall 216 of the weatherstrip 200 of the front door and the front edge of the rear door, and further between the lip 306 of the weatherstrip 300 and the wall 216 of the weatherstrip 200. An additional sealing is provided at opposing rear and front upper corners of the front and rear doors by means of contact between the top sections 218 and 316 of the weatherstrips 200 and 300.

Furthermore, according to the shown embodiment, leakage of water in the drip-channel through the seal between the drip seal and the upper edges of the front and rear doors or through the drip seal and the lips 222 and 322 will not result in introduction of the water through the gap between the opposing vertical edges of the front and rear doors, since the leakage is drained through the openings and the channels defined in the weatherstrips 200 and 300.

Figure 10:
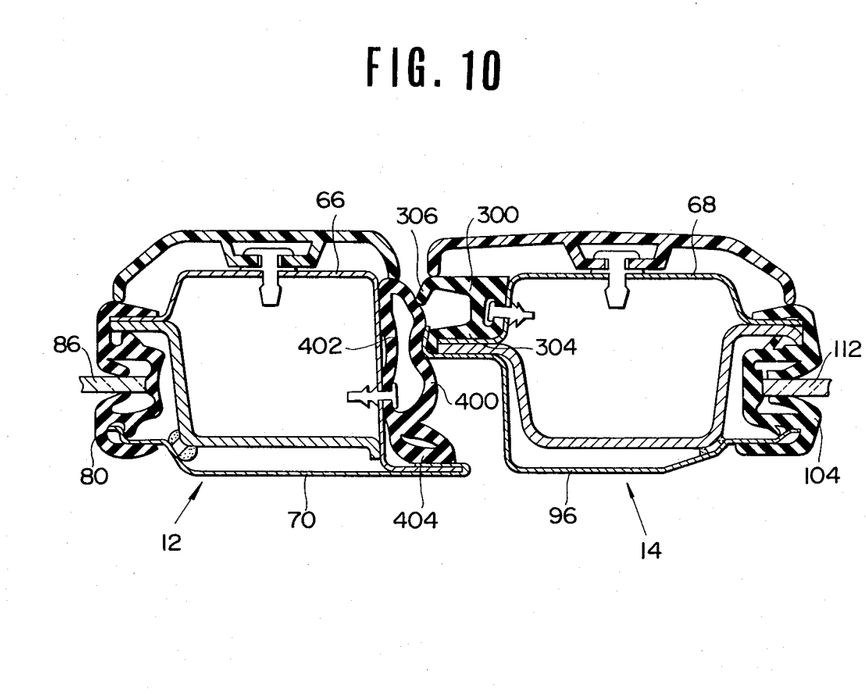
FIG. 10 is a cross-section of the front and rear doors with sealing structure according to the invention, but showing a modification of the preferred embodiment.
Figure 11:
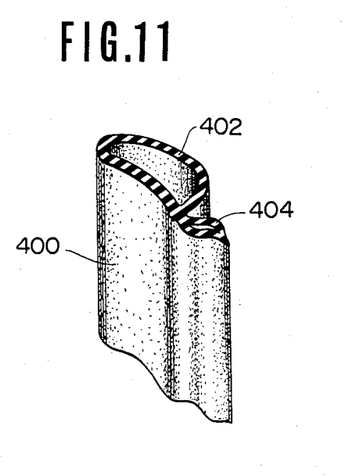
FIG. 11 is a perspective view of a cross-section of a seal for the front door in the sealing structure of FIG. 9.

FIGS. 10 and 11 show a modification of the foregoing first embodiment of the invention, in which the modified form of weatherstrip 400 is applied to the front door. The weatherstrip 400 has a hollow cylindrical major section 402 and a hollow cylindrical extension 404 constituting a substantially gourd-shaped configuration. The larger section 402 of the "gourd" serves as a downspout as described previously. The smaller section 404 is fixed to the inside edge of the front door outer panel 70 to add resilience to the front door weatherstrip 400.

Figure 12:
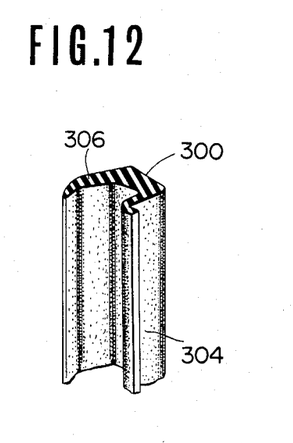
FIG. 12 is a perspective view of a cross-section of a seal for the rear door in the sealing structure of FIG. 9.

As will be appreciated from FIGS. 10 and 12, the weatherstrip 300 to be mounted on the front edge of the rear door 14 is of substantially the same construction as that in the foregoing first embodiment. The weatherstrip 300 is of essentially U-shaped configuration with lip portions 304 and 306 as set forth above. While, the weatherstrip 300 has a bent end at the free end of the lip portion 304, the function of the weatherstrip is substantially the same as the foregoing first embodiment.

As set forth above, according to the present invention, the weatherstrips installed on the rear and front edges of the front and rear doors can prevent any water such as rain water leaking from the drip-channel from entering into the vehicle compartment. Thus, the sealing structure according to the present invention successfully and satisfactory establish a water-tight seal between the directly opposing edges of the front and rear doors, and allow the vehicle to be constructed into center-pillarless body construction with effective water-tight seal.

Thus, the invention fulfills objects and advantages sought therefor.

What is claimed is:

1. In an automotive vehicle having a front door, a rear door the front vertical edge of which opposes to the rear vertical edge of said front door, upper and lower vehicle body side members extending along the upper and lower edges respectively of a door opening to be covered by said front and rear doors, and a roof panel having edge associated with said upper vehicle body side member for defining a drip-channel, a sealing structure comprising:
first and second seals mounted on said upper vehicle body side member, each adapted to sealingly contact the upper edges of said front and rear doors when the latter are in their closed positions;
a third seal mounted on the rear vertical edge of said front door and adapted to sealingly contact the front vertical edge of said rear door;
a fourth seal mounted on the front vertical edge of said rear door and adapted to sealingly contact said third seal along a locus of points of said third seal different from the locus of points along which the front vertical edge of said rear door contacts said third seal; and
said third and fourth seals have top sections positioned beneath said drip-channel and adapted to receive any water passing between said first seal and said upper edges of the front and rear doors, and said third and fourth seals define drain passages for draining the water from said top sections.

2. The structure as set forth in claim 1, wherein said first seal is so associated with said drip-channel for establishing water-tight seal thereof.

3. The structure as set forth in claim 2, wherein said third and fourth seals are respectively formed with funnel-shaped top sections which are associated with said first seal for receiving any water passing through the seal of said drip-channel established by said first seal.

4. The structure as set forth in claim 3, wherein said third and fourth seals have features separate from the loci of contact for interengaging mechanically when the doors are both in their closed positions.

5. The structure as set forth in claim 4, wherein said interengageable features are respectively formed in said top sections of said third and fourth seals.

6. In an automotive vehicle having a front door adapted to cover approximately a front half of a door opening, a rear door adapted to cover approximately a rear half of said door opening and having a front vertical edge opposing a rear vertical edge of said front door, an upper side frame extending along a longitudinal edge of a roof and supporting an edge of a roof panel, a sealing structure comprising:
a first seal cooperative with said edge of the roof panel to define a drip channel and adapted to establish water-proof contact with the upper edges of said front and rear doors;
a second seal mounted on said side frame for establishing water-proof contact with the upper edges of said front and rear doors, said second seal being positioned below said first seal;
a third seal mounted on the rear vertical edge of said front door and adapted to establish water-proofing seal between the front edge of said rear door;
fourth seal equipped onto the front vertical edge of said rear door and adapted to establish a water-proof seal in conjunction with said third seal; and
said third and fourth seals being cooperative with said first seal to drain any water passing through said first seal.

7. The structure as set forth in claim 6, wherein said third and fourth seals have structural features which are mechanically engageable to each other.

8. The structure as set forth in claim 6, wherein said third and fourth seals each have top sections located beneath said first seal for receiving water passing through said first seal and drain passages extending vertically from said top sections.

9. The structure as set forth in claim 8, wherein said third seal is essentially of hollow cylindrical cross-section to define a first drain passage and said fourth seal is essentially of channel-shaped cross-section to define a second drain passage is conjunction with said third seal.

10. The structure as set forth in claim 8, wherein said front door is a swinging door hinged to the front vertical edge of said door opening and said rear door is a sliding door slidable along the vehicle side portion.

11. The structure as set forth in claim 8, wherein said third and fourth seals are respectively formed with funnel-shaped top sections which are associated with said first seal for receiving any water passing through the seal of said drip-channel established by said first seal.

12. A weatherstrip arrangement for automotive vehicle doors which oppose each other directly comprising:
a first member mounted on one of a pair of front and rear doors and adapted to sealingly contact the other door and thereby establish a water-proof seal therebetween, said first member further adapted to serve as a first downspout for a vehicle roof gutter; and
a second member mounted on the other door and adapted to sealingly contact said first member and thereby establish a water-proof seal therebetween, said second member being cooperative with said first member, to form a second downspout for the vehicle roof gutter.

13. The arrangement as set forth in claim 12, wherein said first member has a major portion wherein essentially hollow cylindrical cross-section, and a top portion adapted to receive a water leaking from said vehicle roof gutter, and said second member has a major section with an essentially channel-shaped cross-section which defines said second downspout in conjunction with said first member, and a top portion adapted to receive water leaking from said gutter.

14. The arrangement as set forth in claim 13, wherein said first seal for receiving any water passing through in said top portions which can interengage mechanically.

* * * * *